(12) United States Patent
Hsieh (10) Patent No.: US 8,328,174 B2
(45) Date of Patent: Dec. 11, 2012

(54) COMBINED PLASTIC CHOPPING BOARD STRUCTURE

(75) Inventor: Cheng-Che Hsieh, Yongkang (TW)

(73) Assignee: Tsao RU Co., Ltd., Yung Kang, Tainan Hsien (TW)

( * ) Notice: Subject to any disclaimer, the term of this patent is extended or adjusted under 35 U.S.C. 154(b) by 0 days.

(21) Appl. No.: 12/826,786

(22) Filed: Jun. 30, 2010

(65) Prior Publication Data

US 2012/0001376 A1    Jan. 5, 2012

(51) Int. Cl.
*B23Q 3/00* (2006.01)
*C04B 41/00* (2006.01)
*B29C 65/00* (2006.01)
*B32B 37/00* (2006.01)
*B32B 38/14* (2006.01)

(52) U.S. Cl. ............... 269/289 R; 269/302.1; 264/132; 156/277

(58) Field of Classification Search .......... 269/289 R; 174/534, 541; 156/277, 330; 264/132, 241
See application file for complete search history.

(56) References Cited

U.S. PATENT DOCUMENTS

| | | | | |
|---|---|---|---|---|
| 4,871,317 A * | 10/1989 | Jones | | 439/68 |
| 5,842,689 A * | 12/1998 | Hunter | | 269/54.5 |
| 6,391,806 B1 * | 5/2002 | Carson et al. | | 442/327 |
| 7,614,618 B2 * | 11/2009 | Mok | | 269/289 R |
| 7,758,029 B2 * | 7/2010 | Lim et al. | | 269/289 R |
| 2002/0149148 A1 * | 10/2002 | Chen | | 269/289 R |
| 2002/0185801 A1 * | 12/2002 | Cautereels et al. | | 269/289 R |
| 2003/0094744 A1 * | 5/2003 | Scott | | 269/289 R |
| 2004/0217533 A1 * | 11/2004 | Mok | | 269/289 R |
| 2005/0082732 A1 * | 4/2005 | Chang | | 269/289 R |
| 2005/0253320 A1 * | 11/2005 | Chang | | 269/289 R |
| 2006/0087067 A1 * | 4/2006 | Shamoon | | 269/289 R |
| 2006/0208410 A1 * | 9/2006 | McRorie, III | | 269/289 R |
| 2008/0048376 A1 * | 2/2008 | Farmer et al. | | 269/289 R |
| 2009/0226676 A1 * | 9/2009 | Smith et al. | | 428/195.1 |

FOREIGN PATENT DOCUMENTS

| | | | | |
|---|---|---|---|---|
| JP | 03195522 A | * | 8/1991 | |
| JP | 05146371 A | * | 6/1993 | |
| JP | 05176847 A | * | 7/1993 | |
| JP | 2002246703 A | * | 8/2002 | |
| JP | 2004215718 A | * | 8/2004 | |
| JP | 2005022324 A | * | 1/2005 | |
| JP | 2005204904 A | * | 8/2005 | |
| JP | 2010057617 A | * | 3/2010 | |

* cited by examiner

*Primary Examiner* — Lee D Wilson
*Assistant Examiner* — Alvin Grant
(74) *Attorney, Agent, or Firm* — Jackson IPG PLLC (57) ABSTRACT

A combined plastic chopping board structure includes an upper chopping board, a lower chopping board, and a base. The upper and lower chopping boards have a geometric shape in any color. The upper and lower chopping boards have pattern holes or first hanging holes thereon. The base is integrally formed with the upper and lower chopping boards by injection. The base has a protruding pattern to engage with the pattern holes of the upper and lower chopping boards and a second hanging hole corresponding to the first hanging holes. The upper and lower chopping boards are in different colors and have the pattern holes for identification with ease. The base can be coupled with the upper chopping board or the lower chopping board only to become a one-piece chopping board having two faces in different colors to lower the cost.

6 Claims, 8 Drawing Sheets

COMBINED PLASTIC CHOPPING BOARD STRUCTURE

BACKGROUND OF THE INVENTION

1. Field of the Invention

The present invention relates to a combined plastic chopping board structure, and more particularly to an upper chopping board and a lower chopping board attached to two sides of a base. The chopping board structure has two faces in different colors for identification with ease.

2. Description of the Prior Art

Figure 7:
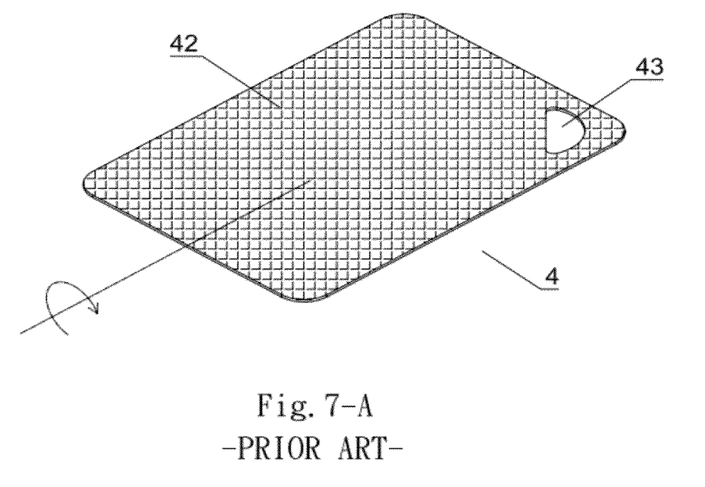
FIG. 7 is a perspective view of a conventional plastic chopping board.
Figure 8:
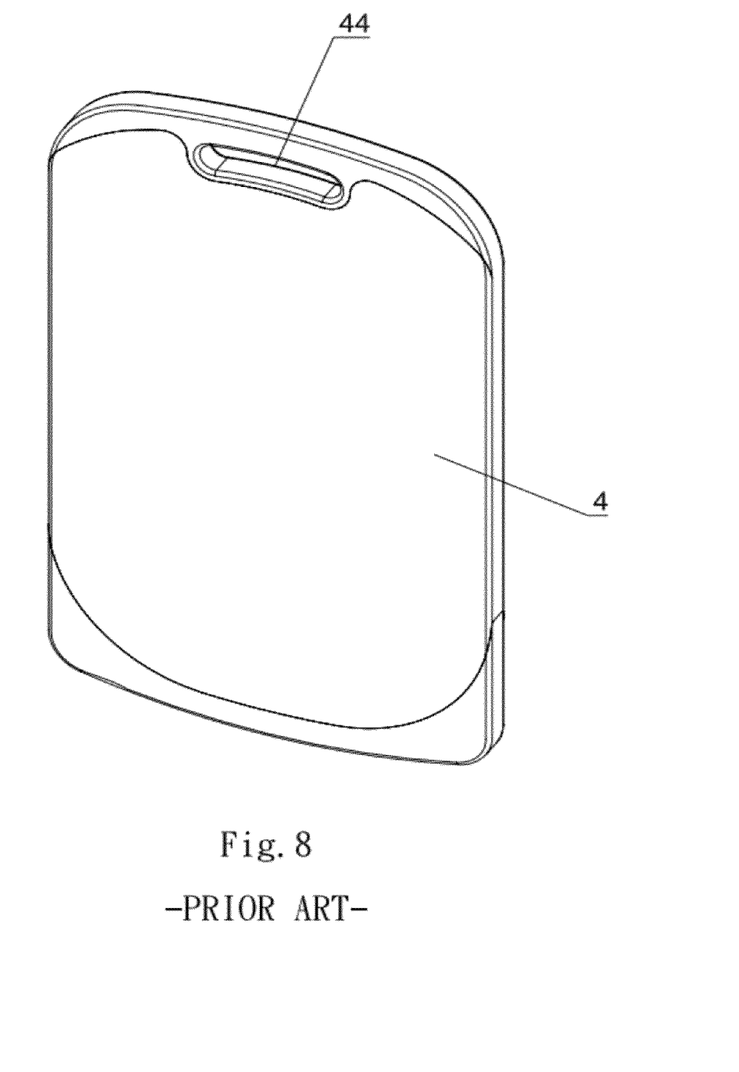
FIG. 8 is a perspective view of another conventional plastic chopping board.

As shown in FIG. 7, FIG. 7-A, a conventional plastic chopping board 4 has a surface printed with a sign, a pattern, a trademark, or the like. The surface is provided with a protective layer 41 which is treated with antimicrobial treatment for identification and marking purposes. The back of the chopping board 4 is provided with a non-slip layer 42 to position the chopping board in place when in use. The chopping board 4 has a hanging hole 43 for hanging the chopping board 4. Another conventional plastic chopping board 4, as shown in FIG. 8, is also treated with antimicrobial treatment, which is a wear-resisting plastic board. This chopping board 4 has a handle 44 and two faces for chopping.

1. The former plastic chopping board needs a complicated process to manufacture, which is not cost-effective. Although the non-slip layer is provided on the back of the chopping board, the non-slip effect is limited when the chopping board is contact with water. This is inconvenient when in use. Because the back of the chopping board is provided with the non-slip layer, the chopping board can be used with a single face.

2. The latter plastic chopping board is a dual-face and wear-resisting chopping board. In order to prevent the chopping board from moving when in use, the weight of the chopping board must be increased. This increases the production cost. Both faces of the chopping boards are in the same color, without signs, patterns, trademarks for identification or marking. The user may be confused when using the chopping board to influence the hygiene.

SUMMARY OF THE INVENTION

The primary object of the present invention is to provide a combined plastic chopping board structure which includes an upper chopping board, a lower chopping board, and a base. The upper and lower chopping boards have a geometric shape in any color. The upper and lower chopping boards are treated with antimicrobial treatment. The upper and lower chopping boards have pattern holes or first hanging holes thereon. The base is integrally formed with the upper and lower chopping boards by injection. The base has a protruding pattern to engage with the pattern holes of the upper and lower chopping boards and a second hanging hole corresponding to the first hanging holes. The upper and lower chopping boards are in different colors and have the pattern holes for identification with ease. The base can be coupled with the upper chopping board or the lower chopping board only to become a one-piece chopping board having two faces in different colors to lower the cost.

Preferably, the base has a handle. The base is integrally formed with the upper and lower chopping boards by injection. The base has an outer frame which is flush with or slightly higher than outer edges of the upper and lower chopping boards to form a stop groove to retain water.

BRIEF DESCRIPTION OF THE DRAWINGS

FIG. 2-A is a rear perspective view according to the first embodiment of the present invention;

FIG. 4-A is a rear perspective view according to the second embodiment of the present invention;

FIG. 6-A and FIG. 6-B are schematic views showing that an upper chopping board, a lower chopping board and a base of the present invention are integrally formed by injection;

FIG. 7-A is a rear view of FIG. 7; and

DETAILED DESCRIPTION OF THE PREFERRED EMBODIMENTS

Embodiments of the present invention will now be described, by way of example only, with reference to the accompanying drawings.

Figure 1:
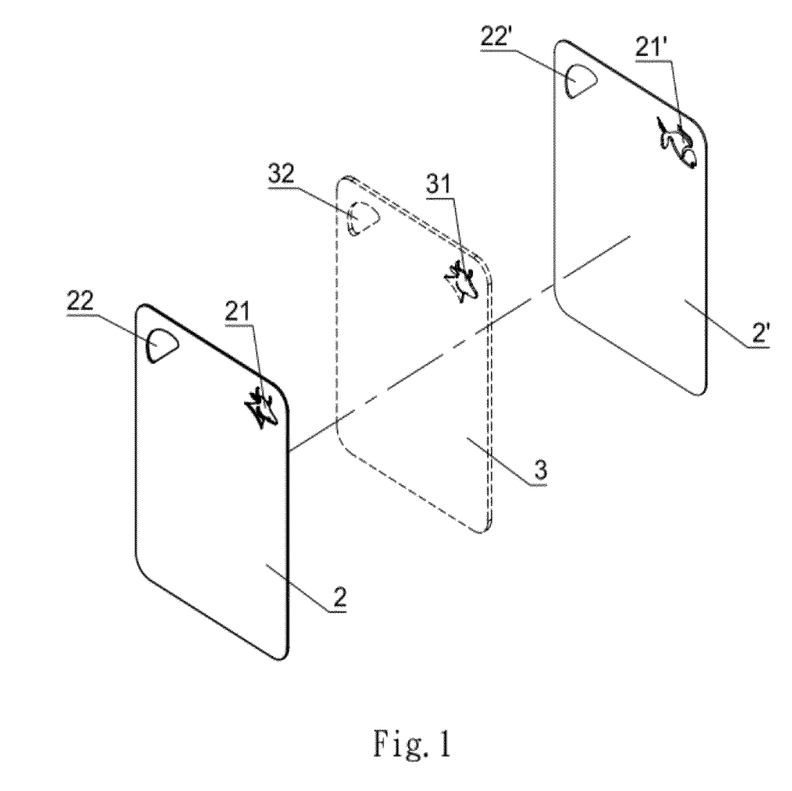
FIG. 1 is an exploded view according to a first embodiment of the present invention.
Figure 2:
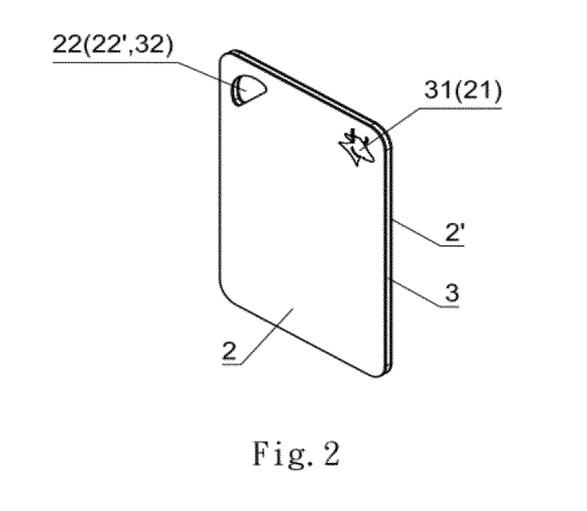
FIG. 2 is a perspective view according to the first embodiment of the present invention.

As show in FIG. 1, FIG. 2 and FIG. 2-A, the present invention comprises an upper chopping board 2, a lower chopping board 2', and a base 3.

The upper and lower chopping boards 2, 2' are formed by extrusion, pressing or injection and have a geometric shape in any color. The geometric shape may be a square, oval or the like. The upper and lower chopping boards 2, 2' are treated with antimicrobial treatment so as to prevent bacteria. The upper and lower chopping boards 2, 2' have pattern holes 21, 21' or first hanging holes 22, 22' thereon. The pattern holes 21, 21' are signs, figures or trademarks for identifying or marking the chopping boards.

The base 3 is integrally formed with the upper and lower chopping boards 2, 2', by injection. The base 3 has a protruding pattern 31 to engage with the pattern holes 21, 21' of the upper and lower chopping boards 2, 2' and a second hanging hole 32 corresponding to the first hanging holes 22, 22'. The base 3 can be a hand-held board corresponding in shape to the upper and lower chopping boards 2, 2'. The chopping board of the present invention is treated with antimicrobial treatment, enhancing the practical use and providing an identification effect.

Figure 6:
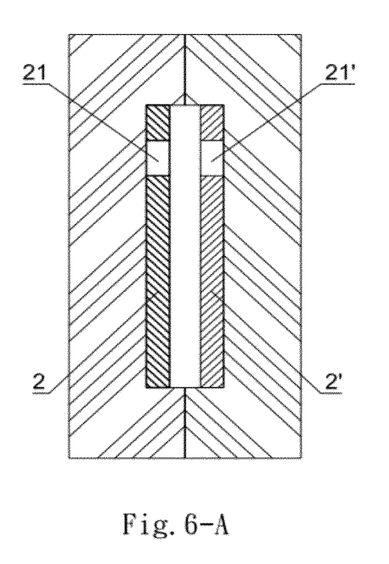

FIG. 1, FIG. 2, FIG. 2-A, FIG. 6-A and FIG. 6-B show a first embodiment of the present invention. The base 3 is placed between the upper and lower chopping boards 2 and 2' and integrally formed with the upper and lower chopping boards 2 and 2' by injection. The protruding pattern 31 and the second hanging hole 32 respectively correspond to the pattern holes 21, 21' and the first hanging holes 22, 22'. The chopping board of the present invention has two chopping faces, as shown in FIG. 6-A and FIG. 6-B. The pattern hole 21 of the upper chopping board 2 is in the shape of a cow, and the upper chopping board 2 is in a single color. The pattern hole 21' of the lower chopping board 2' is in the shape of a fish, and the lower chopping board 2' is in another single color. The chopping board of the present invention helps the user to remember and recognize the chopping surfaces and provides the hanging holes for hanging or drying the chopping board. The base 3 can be coupled with the upper chopping board 2 or the lower chopping board 2' only to become a one-piece chopping board having two faces in different colors.

Figure 3:
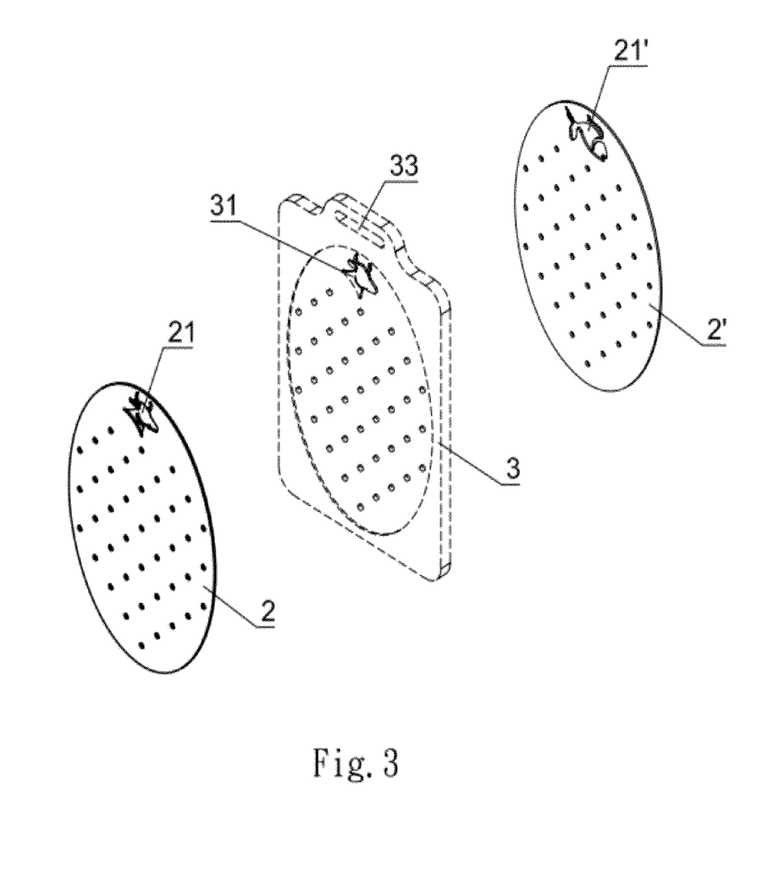
FIG. 3 is an exploded view according to a second embodiment of the present invention.
Figure 4:
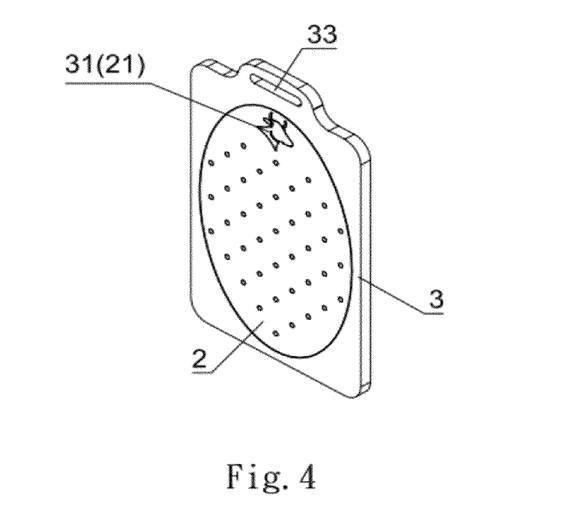
FIG. 4 is a perspective view according to the second embodiment of the present invention.

FIG. 3, FIG. 4 and FIG. 4-A show a second embodiment of the present invention. The base 3 has a handle 33. The base 3 is placed between the upper and lower chopping boards 2 and 2' and integrally formed with the upper and lower chopping boards 2 and 2' by injection. The protruding pattern 31 corresponds to the pattern holes 21, 21'. The base 3 has an outer frame which is flush with outer edges of the upper and lower chopping boards 2, 2'. The chopping board of this embodiment is a hand-held and dual-face chopping board, providing the same effects.

Figure 5:
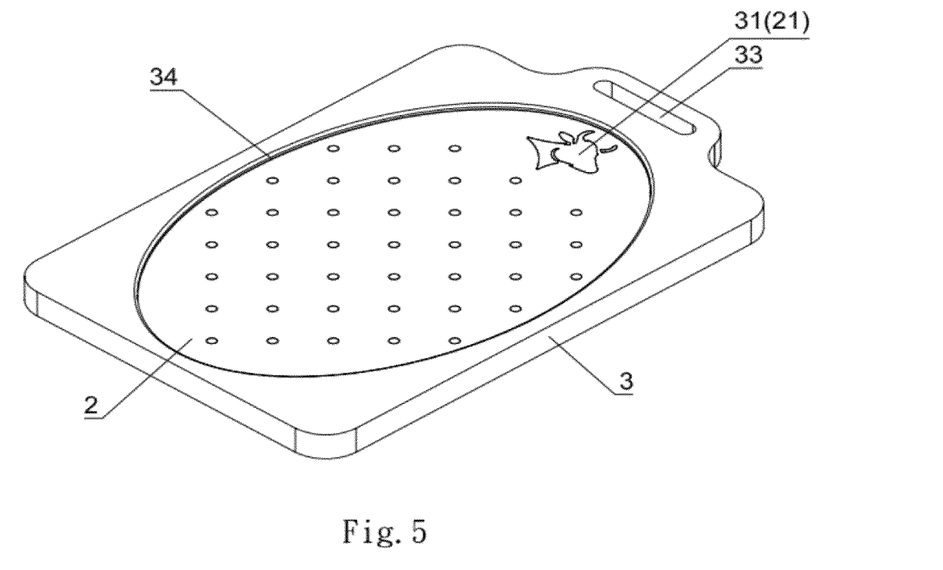
FIG. 5 is a perspective view according to a third embodiment of the present invention.

FIG. 5 shows a third embodiment of the present invention. The base 3 is placed between the upper and lower chopping boards 2 and 2' and integrally formed with the upper and lower chopping boards 2 and 2' by injection. The protruding pattern 31 corresponds to the pattern holes 21, 21'. The base 3 has an outer frame which is slightly higher than outer edges of the upper and lower chopping boards 2, 2' to form a stop groove 34 to retain water.

Accordingly, the chopping board of the present invention can be treated with antimicrobial treatment to lower the cost and to enhance the positioning, identification and so on.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A combined plastic chopping board structure, comprising:
　　an upper chopping board and a lower chopping board, the upper and lower chopping boards being formed by extrusion, pressing or injection and having a geometric shape in any color, the upper and lower chopping boards each having a pattern hole thereon; and
　　a base, the base wherein the base is a hand-held board corresponding in shape to the upper and lower chopping boards and wherein the base is integrally formed with the upper and lower chopping boards by injection, the base having a protruding pattern to engage with each of the pattern holes and wherein the base has an outer frame which encircles and is flush with or slightly higher than outer edges of the upper and lower chopping boards to form a stop;
　　thereby, the upper and lower chopping boards being coupled to two sides of the base and the protruding pattern both engaging with and extending through the pattern hole to become one-piece.

2. The combined plastic chopping board structure as claimed in claim 1, wherein the geometric shape is a square or an oval.

3. The combined plastic chopping board structure as claimed in claim 1, wherein the pattern hole is a sign, a figure or a trademark.

4. The combined plastic chopping board structure as claimed in claim 1, wherein each of the upper and lower chopping boards has a first hanging hole thereon and the base has a second hanging hole corresponding in position to the first hanging hole.

5. The combined plastic chopping board structure as claimed in claim 1, wherein the base is coupled with the upper chopping board or the lower chopping board only to become a one-piece chopping board having two faces in different colors.

6. The combined plastic chopping board structure as claimed in claim 1, wherein the protruding pattern of the base further comprises:
　　an upper protruding pattern which completely fills the pattern hole in the upper chopping board; and
　　a lower protruding pattern which completely fills the pattern hole in the lower chopping board.

* * * * *